United States Patent [19]

Arsac et al.

[11] 4,310,331
[45] Jan. 12, 1982

[54] PROCESS FOR THE PREPARATION OF THE DYESTUFF DIRECT YELLOW 11 IN THE FORM OF CONCENTRATED STABLE SOLUTIONS, THE SOLUTIONS OBTAINED AND THEIR APPLICATIONS

[75] Inventors: Aimé J. Arsac, Condrieu; Pierre Frank, Saint Clair du Rhone, both of France

[73] Assignee: Produits Chimiques Ugine Kuhlmann, Courbevoie, France

[21] Appl. No.: 237,566

[22] Filed: Feb. 23, 1981

[30] Foreign Application Priority Data

Mar. 21, 1980 [FR] France ................. 80 06319

[51] Int. Cl.³ ............... C07C 105/00; C09B 56/04; C09B 67/02; C09B 67/26
[52] U.S. Cl. ........................... 8/527; 260/143; 260/205; 260/505 R
[58] Field of Search ............... 8/527; 260/143, 505 R

[56] References Cited

U.S. PATENT DOCUMENTS

| | | | |
|---|---|---|---|
| 2,821,550 | 1/1958 | Strobel | 260/505 R |
| 3,122,529 | 2/1964 | Huey et al. | 260/143 |
| 3,547,774 | 12/1970 | Rebhahn et al. | 260/505 R |
| 3,557,079 | 1/1971 | Doody | 260/143 |
| 3,905,949 | 9/1975 | Perkins et al. | 260/143 |
| 3,953,419 | 4/1976 | Pedrazzi | 260/143 |

FOREIGN PATENT DOCUMENTS

| | | |
|---|---|---|
| 631379 | 8/1963 | Belgium . |
| 757179 | 10/1970 | Belgium . |
| 2820487 | 11/1979 | Fed. Rep. of Germany . |
| 2289578 | 5/1976 | France . |
| 2316296 | 1/1977 | France . |
| 2323742 | 4/1977 | France . |

*Primary Examiner*—Maria Parrish Tungol
*Attorney, Agent, or Firm*—Beveridge, Degrandi, Kline & Lunsford

[57] ABSTRACT

The invention relates to a process for the preparation of the dyestuff Direct Yellow 11 directly in the form of stable concentrated solutions, in which caustic soda in aqueous solution is reacted, at a temperature from 40° to 90° C., with a solution containing 4-nitro-toluene-2-sulfonic acid, one or more alkanolamines, one or more alcohols containing an etheroxide function or a second alcohol function, then the caustic soda is neutralized by addition of sulfuric acid and the sodium sulfate thus formed is separated by filtration. The solutions obtained by the process according to the invention are particularly suitable for dyeing cellulosic materials and leather.

13 Claims, No Drawings

PROCESS FOR THE PREPARATION OF THE DYESTUFF DIRECT YELLOW 11 IN THE FORM OF CONCENTRATED STABLE SOLUTIONS, THE SOLUTIONS OBTAINED AND THEIR APPLICATIONS

The present invention relates to a process for the preparation of the dyestuff Direct Yellow 11 (Color Index 40000) directly in the form of concentrated solutions which are stable on storage, the solutions thus obtained and also the application and utilization of these solutions.

The anionic water-soluble dyestuffs are generally sold and used in the form of powders containing a more or less large proportion of inorganic salts. The method of preparation of these dyestuffs has some advantages but also a number of drawbacks. The principal advantage lies in the great stability on storage of these products, and in particular no modifications are observed during their storage, even at temperatures below 0° C., which enables them to be kept at all seasons in unheated places.

On the other hand, it is well known that dyestuffs in powder form have a marked tendency to produce dust when they are handled. Attempts have been made to remove this disadvantage by various processes. Thus the formation of dusts is effectively reduced by addition of oils or hygroscopic liquids, but on the other hand, the solution of the dyestuffs thereby becomes more difficult. It has also been attempted to give the dyestuffs a form which produces little dust by converting them into granules. The dyestuffs then being in a very compact form, this results in great difficulties in dissolving them, especially when dyestuffs having little solubility in water are concerned, as in the case of the dyestuffs of the present invention when they are present in powder form.

Aqueous or hydro-organic solutions of anionic dyestuffs such as Direct Yellow 11 in the form of a salt of an organic base such as tris[2-(2-hydroxy-ethoxy)-ethyl-]amine, are described in French Pat. No. 2,289,578 which corresponds to British Pat. No. 1,480,712. However, the method of obtaining these solutions has drawbacks since the dyestuff is prepared according to the usual process by treatment of 4-nitrotoluene-2-sulfonic acid with caustic soda in aqueous solution and the suspension of the sodium salt of the dyestuff thus obtained includes an appreciable amount of $Na^+$ ions which interferes with the solubility of the dyestuff. The $Na^+$ ions have to be removed by means of hexafluorosilicic acid. Owing to the sensitivity of this acid and its salts toward alkaline agents, it is necessary to use an excess of acid which then has to be neutralized.

In addition, compared with acids such as hydrochloric and sulfuric acids, hexafluorosilicic acid is a product little used in the dyestuff industry and is relatively expensive when taking into account its molecular weight. The dyestuff obtained has a high cost price although the powder actually on the market constitutes one of the cheapest dyestuffs used all over the world.

Finally, and as emphasized by the previously mentioned French patent, the solutions obtained are only stable on storage at temperatures between 0° C. and 40° C., which is not without the problems arising from the seasons or the regions in which the solutions are stored.

It has now been found that it is possible to prepare the dyestuff Direct Yellow 11 (CI 40000) directly in the form of concentrated solutions, stable to storage, particularly suitable for the dyeing of cellulosic materials and leather without having to interpose any raw material which is not used in the dyestuffs industry.

The process according to the invention comprises reacting at a temperature from 40° C. to 90° C. an aqueous solution of caustic soda with a solution containing 4-nitro-toluene-2-sulfonic acid, one or more alkanolamines and one or more alcohols containing an ether oxide function or a second alcohol function, then neutralizing the caustic soda with sulfuric acid and separating the sodium sulfate thus formed by filtration.

For 100 parts by weight of 4-nitro-toluene-2-sulfonic acid there are preferably used 180 to 400 parts of one or more alcohols, 70 to 150 parts of one or more alkanolamines and 200 to 300 parts of caustic soda in aqueous solution. The 4-nitro-toluene-2-sulfonic acid used is a pure product or an industrial product containing up to 20 parts of sulfuric acid and 60 parts of water.

The time of reaction varies from one-half hour to 4 hours depending on the temperature used, with lower temperatures requiring longer reaction times.

Among the alcohols, it is preferred to use ethanediol or ethyleneglycol, diethyleneglycol, the methyl ether of monoethyleneglycol, the ethyl ether of monoethyleneglycol, the methyl ether of diethyleneglycol, the ethyl ether of diethyleneglycol or mixtures of these alcohols.

Of the alkanolamines, monoethanolamine, diethanolamine and especially triethanolamine or mixtures of these alkanolamines may be mentioned as useful.

By varying the reaction conditions such as temperature, quantity of caustic soda or reaction time, solutions may be prepared ranging from a yellow to an orange shade.

According to a particular form of the invention, industrial 4-nitro-toluene-2-sulfonic acid may be used containing, per 100 parts of acid, 0 to 15 parts of sulfuric acid and 0 to 40 parts of water, in solution in 230 to 350 parts of diethyleneglycol methyl ether or a mixture of alcohols containing at least 60% of diethyleneglycol methyl ether and 70 to 120 parts of triethanolamine or a mixture of mono-, di- and triethanolamines comprising at least 90% of triethanolamine.

By means of the process according to the invention, it is possible to prepare stable solutions containing from 10 to 25%, and preferably from 10 to 15% of Direct Yellow 11 dyestuff calculated as its free acid form.

It is also possible to adjust to a standard value the concentration of the solutions, after their preparation, by addition of water and/or alcohol and/or alkanolamine.

The solutions obtained by the process according to the present invention are characterized by a very good stability to storage at temperatures from over 40° C. to −15° C. even over a period of several weeks. When keeping at temperatures less than −15° C. the solutions become more viscous but remain homogeneous, they do not show any crystallization and become fluid again when temperature rises to −5° C.

The solutions are particularly suitable for the dyeing of cellulosic materials such as cotton or paper as well as the dyeing of leather a yellow to orange shade. These dyeings show a fastness at least as good as and sometimes better than with the dyes in the powder form.

The following examples serve to illustrate the invention without it being restricted thereto, the parts indicated being parts by weight.

EXAMPLE 1

307 parts of crude 4-nitro-toluene-2-sulfonic acid comprising 217 parts of pure product, 20 parts of sulfuric acid and 70 parts of water are dissolved in 700 parts of diethyleneglycol methyl ether by means of 226 parts of triethanolamine. While the temperature is allowed to rise up to 45° C., 533 parts of a 30% solution of caustic soda are added in a period of 30 minutes. The temperature is maintained between 45° and 48° C. for one hour, then 220 parts of a 94% solution of sulfuric acid are added, the temperature then rising to about 70° C. The sodium sulfate formed is separated by filtration. A solution containing 12.6% of the free acid of the Direct Yellow 11 is obtained. This solution is perfectly stable and does not crystallize, even at temperatures much lower than 0° C. The weight of the solution obtained is 1560 parts which corresponds to 1160 parts of the commercial product in powder form. The concentration of this solution can be adjusted to a concentration such that 150 parts of solution corresponds to 100 parts of the powder by addition of 180 parts of water, triethanolamine, diethylene glycol methyl or ethyl ether, ethyleneglycol, diethyleneglycol or ethyleneglycol methyl or ethyl ether. The solution obtained which contains 1.4% of sulfate ions remains fluid even at −20° C. and does not crystallize on storage.

If the 226 parts of pure triethanolamine are replaced by the same quantity of a mixture containing 93 parts of pure triethanolamine, 4 parts of diethanolamine and 3 parts of monoethanolamine per 100 parts of crude product, a dyestuff quite as good is obtained.

EXAMPLE 2

On operating under the same conditions as in Example 1 but with 500 parts of diethyleneglycol methyl ether instead of 700 parts, 1320 parts are obtained of a solution containing 14.5% of free acid of the same dyestuff.

EXAMPLE 3

The operation is as indicated in Example 1 but with 600 parts of diethyleneglycol methyl ether and at a temperature of from 50° to 55° C. instead of 45° to 48° C. 1450 parts are obtained of a solution containing 13.5% of the free acid of the dyestuff dyeing cellulosic fibers or leather a yellowish orange shade.

EXAMPLE 4

The operation is effected as indicated in Example 3 but at a temperature of from 60° to 65° C. The dyestuff obtained is an orange with a yellow tendency.

EXAMPLE 5

On operating as in Example 3 at a temperature between 80° and 85° C., a dyestuff of orange shade is obtained.

EXAMPLE 6

100 parts of chrome-tanned pure suede leather are moistened again in the presence of a little ammonia, rinsed and introduced into a fuller containing a solution of 10 parts of the dyestuff of Example 1 in 2000 parts of water at 60° C. Fulling is carried out for 1 hour at 60° C., then 3 parts of formic acid are introduced and fulling is effected for a further 30 minutes. The leather is dried and subjected to the usual treatments. A leather dyed a bright uniform yellow shade is obtained.

EXAMPLE 7

A paste of bleached cellulose in bisulfite is prepared in a disintegrator and its concentration is regulated at 25 g/l. 0.6 parts of the dyestuff of Example 3 are added to 1600 parts of this paste, it is mixed and 4 parts of a 10% solution of colophony in water are added and then 12 parts of a 10% solution of aluminum sulfate in water and it is then put in a mold on the machine. Sheets dyed uniformly an orange yellow shade are obtained.

EXAMPLE 8

2 parts of the dyestuff obtained in Example 1 and 1 part of sodium carbonate are dissolved in 1000 parts of water at 40° C. 100 parts of a cotton fabric are introduced, then 10 parts of sodium sulfate are added. The fabric is dyed for 1 hour at 90° C., rinsed in cold water and dried. The fabric is dyed a bright yellow shade.

What is claimed is:

1. A process for the preparation of the dyestuff Direct Yellow 11, directly in the form of stable concentrated solutions, which comprises reacting caustic soda in aqueous solution with a solution containing 4-nitro-toluene-2-sulfonic acid, one or more alkanolamines and one or more alcohols containing an etheroxide function or a second alcohol function, at a temperature of 40° to 90° C., then neutralizing the caustic soda with sulfuric acid and separating the sodium sulfate thus formed by filtration.

2. A process according to claim 1 in which 180 to 400 parts of one or more alcohols, 70 to 150 parts of one or more alkanolamines and 200 to 300 parts of caustic soda in aqueous solution are used to 100 parts of 4-nitro-toluene-2-sulfonic acid.

3. A process according to claims 1 or 2 in which the 4-nitro-toluene-2-sulfonic acid is an industrial product containing up to 20 parts of sulfuric acid and 60 parts of water per 100 parts of acid.

4. A process according to claims 1 or 2 in which the reaction time varies, according to the temperature used, from one-half to 4 hours.

5. A process according to claim 1 or 2 in which the alcohol is ethanediol, ethyleneglycol, diethyleneglycol, the methyl or ethyl ether of the monoethylene glycol, the methyl or ethyl ether of the diethylene glycol or mixtures of these alcohols.

6. A process according to claims 1 or 2 in which the alkanolamine is monoethanolamine, diethanolamine, triethanolamine or mixtures of these alkanolamines.

7. A process according to claims 1 or 2 in which 4-nitro-toluene-2-sulfonic acid is used which contains per 100 parts of acid, 0 to 15 parts of sulfuric acid and 0 to 40 parts of water, in solution in 230 to 350 parts of diethyleneglycol methyl ether, or a mixture of alcohols containing at least 60% of diethyleneglycol methyl ether and 70 to 120 parts of triethanolamine or a mixture of mono-, di- and tri-ethanolamines containing at least 90% of triethanolamine.

8. Concentrated solutions obtained according to the process of claim 7.

9. Concentrated solutions obtained according to the process of claim 6.

10. Concentrated solutions obtained according to the process of claim 5.

11. Concentrated solutions obtained according to the process of claim 4.

12. Concentrated solutions obtained according to the process of claim 3.

13. Concentrated solutions obtained according to the process of claims 1 or 2.

* * * * *